Jan. 30, 1923.
J. J. POTTINGER.
AUTOMOBILE LOCK.
FILED APR. 9, 1921.
1,443,824.
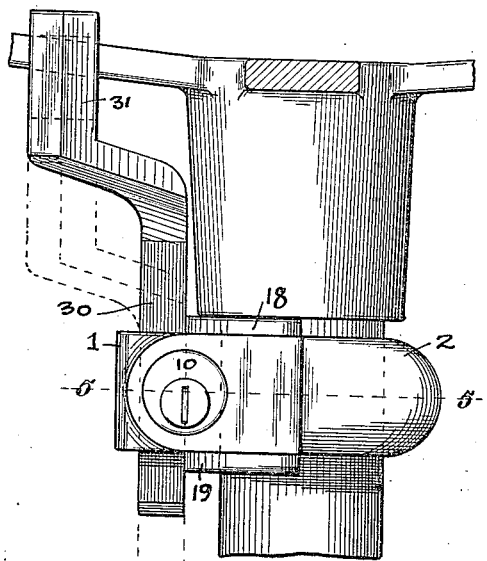
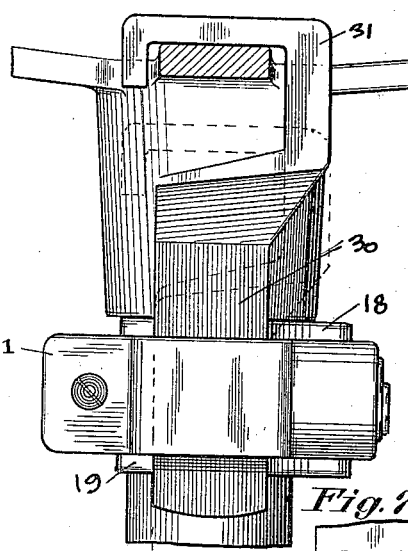
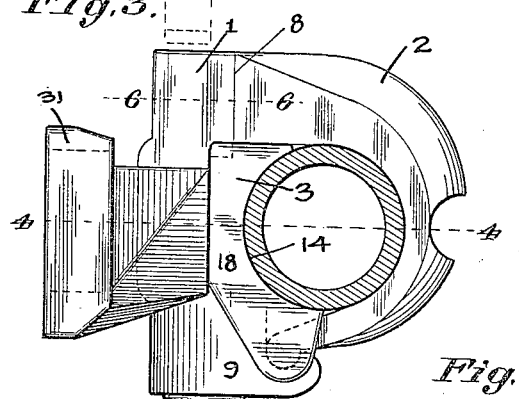
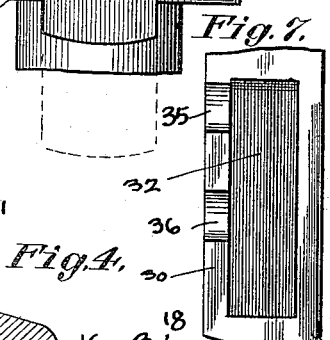
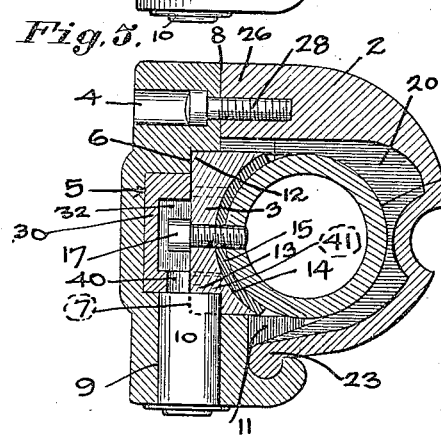
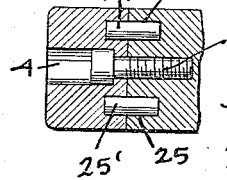
Inventor,
JOHN J. POTTINGER
By Baldwin Vale
Attorney Patented Jan. 30, 1923.

1,443,824

UNITED STATES PATENT OFFICE.

JOHN J. POTTINGER, OF OAKLAND, CALIFORNIA.

AUTOMOBILE LOCK.

Application filed April 9, 1921. Serial No. 459,966.

*To all whom it may concern:*

Be it known that I, JOHN J. POTTINGER, a citizen of the United States, and a resident of the city of Oakland, county of Alameda, State of California, have made a new and useful invention to wit, Improvements in Automobile Locks; and I do hereby declare the following to be a full, clear, concise and exact description of the same.

This invention relates particularly to an improved means for engaging the steering wheel of automotive vehicles for the purpose of preventing any movement thereof and with the further object of minimizing the surreptitious use of such vehicles.

The principal object of this invention consists in providing an improved construction and arrangement of parts for mounting the theft preventive upon the supporting column of steering wheels.

A further object is to provide a device of this character that will be superior in point of simplicity and inexpensiveness of construction, positiveness of operation, facility and convenience in use and general efficiency, as contrasted with any similar device. Other objects and advantages will appear as this description progresses.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying one-sheet of drawings,

Figure 1 represents a side elevation of an automobile lock as constructed in accordance with my invention applied in operative position to the supporting column of a steering wheel of which a fragmentary portion is shown.

Figure 2 represents a front elevation of Figure 1.

Figure 3 represents a plan view of Figure 1 with the arms of the steering wheel omitted.

Figure 4 represents a vertical section through Figure 3 on the line 4—4.

Figure 5 represents a sectional plan view through Figure 1 on the line 5—5.

Figure 6 represents a sectional detail taken through Figure 3 on the line 6—6.

Figure 7 is a fragmentary detail of the locking arm showing a portion thereof.

Figure 8 represents a modified form of locking arm in engagement with a modified type of steering wheel arm.

Figure 9 represents a still further modified type of steering wheel engaging arm.

In detail the construction illustrated in the drawings comprises, an arm supporting casing 1, a steering column engaging member 2, and a spacer element 3 adapted to be interposed between the steering column, collar 2 and the arm supporting casing 1, combined and arranged to completely enclose all of the operating mechanism for attaching the device to the steering column. The arm supporting member is provided with an opening 4 passing laterally therethrough and with a cored depression 5 substantially in the center thereof through which a steering wheel spoke engaging member is adapted to be freely slidable. Sockets 6 and 7 are provided in the face 8 of the member 1 by forming a depression slightly larger than the arm depression 5. The end 9 of the member 1 is drilled longitudinally for the purpose of providing a housing for the barrel of the cylinder 10 adapted to be securely mounted therein. The inner face 8 of the member 1 on the end 9 thereof is provided with a hook-shaped arm, projecting laterally relative to the face 8, leaving a socket depression 11 between its end and the face of the member 8, for the purpose to be hereinafter described in detail.

The spacer or bushing element 3 is provided with squared corners 12 and 13, respectively, that are adapted to seat within the sockets 6 and 7 formed in the face 8 of the arm supporting casing 1. The opposite face of the element 3 is adapted to project away from the plane of the surface 8 of the member 1 (when the respective parts are mounted in co-operative position) and is formed with a radial curvature 14 substantially the same as that of a steering column to which it is to be applied. A gasket 15 of a resilient composition is adapted to be mounted within a groove 16, cored in the curved face 14 of the member 3 for the purpose of contacting with the exterior periphery of the steering column when applied and tending to securely fix the position of the said element. The opposite face of the element 3 is drilled and threaded and has a screw 17 engaged therewith having the end thereof adapted to engage a hole in the steering column and the head thereof projecting into the depression 5 formed in the casing 1. The upper and lower faces 18 and 19 of the element 3 are adapted to partially overlap and cover the upper and lower faces of the member 1 to prevent any vertical movement of the element 3 relative thereto, and to close the meeting faces of the assembled casing, bushing and element 2 to be hereinafter mentioned.

A steering column engaging element 2 is formed with the interior periphery thereof equal to the circumference of the steering column about which it is to be mounted. For the sake of cheapness in construction, it is preferable that the member 2 be cored out as at 20 leaving the upper and lower lips 21 and 22 formed on the desired radial contour and adapted to contact with the steering column. One end 23 of the element 2 is provided with a substantial, knobular terminus that is adapted to fit within the socket 11 of the hook 10 formed on the casing 1. In the opposite end of said member, holes 24 and 25 engage companion projecting pins 24' and 25' extending from the face 8 of the arm casing 1. The end 26 of said member 2 is also drilled so as to register with the opening 4 provided in the casing 1 and may be either threaded as shown, and a screw connecting member 28 mounted therein or a wedge pin may be passed through the hole 4 and into the registering opening, aforementioned, and driven in so tightly as to wedge the respective members into an immovable relation. The exposed end of the pin would, as a matter of course, be smoothed off flush with the outer face of the casing 1 and would thus prevent separation of the members 1 and 2. The element 2 is preferably made of substantially the same width as the casing 1, so that the meeting faces of the respective elements will be covered by the projecting surfaces 18 and 19 of the intermediate member 3.

In standardizing the construction of the assembled lock, it has been found that the arm supporting casing 1 will always remain substantially of the same size and that by arranging the radial curvature of the opposing faces of the collar 2 and element 3 to fit the circumference to any steering column, to which it is applied, it only becomes necessary to have the last named parts of differing diameters.

The arm member 30 comprises an elongated rectangular member, approximately of the same cross-sectional area as the depression 5 formed in the casing 1, and is adapted to slide vertically, within said depression, relative to the casing. Likewise the arm member may either be provided with a hook-shaped end 31 shown in Figures 1, 2 and 3 for passing over and clamping down upon an arm of a steering wheel or it may be provided with an end adapted to project between the spokes of a steering wheel, or into a single channel shaped spoke as shown in Figure 8, or further modified in the shape of a yoke adapted to straddle one of said last mentioned spokes, as shown in Figure 9. It is to be understood, however, that the shape of the steering wheel engaging element is immaterial as any form is the equivalent of the other and that each would function in substantially the same manner. The portion of the arm 30 adapted to slide in the casing 1 is provided with a groove or depression 32 therein for the purpose of freely passing the head of the screw 17 secured in the element 3 so that the vertical movement of the arm 30 is limited by the head of the screw 17 abutting the upper and lower ends of the said groove 32. The arm 30, on the inner face thereof is provided with a pair of spaced substantially semi-circular openings 35 and 36 therein for the purpose to be hereinafter described in detail.

In installing the apparatus on the steering column of an automobile, the casing 1 is first grasped by the operator and the arm 30 placed in the depression 5 so that the groove 32 faces outwardly. The element 3 would next be placed in contact with the face 8 of the casing 1 so that the corners 12 and 13 would lodge in the sockets 6 and 7 and the cover members 18 and 19 would extend over the upper and lower faces of the casing 1. The assembled casing arm and element 3 would then be placed in contact with the exterior circumference of the steering column with the gasket 16 of the element 3 in contact with the said column. The end 23 of the member 2 would then be placed within the socket 11 of the casing 1 and moved radially so as to partially surround the remaining portion of the column placing the opposite end 26 of the member 2 in contact with the meeting face 8 of the casing member 1. The respective members 2 and 3 would approximately extend around the entire circumference of the column and snugly engage the same. The locking pin 28 would then be passed through the opening 4 in the casing member into the companion registering opening in the member 2, in which position the same would be tightly wedged to a rigid fit to prevent any lateral movement of the members 1 and 2 relative to each other or vertically relative to the steering column.

In the normal inoperative position, the arm 30 would rest as shown by the dotted lines in Figures 1 and 2 and could be fixedly maintained in such position by rotating the latch 40 in the barrel of the cylinder 10 into engagement with the uppermost circular slot 35 provided in the said arm 30. The latch portion 40 is semi-circular in cross-section and it is adapted to be moved out of contact with the arm 30 by rotating the barrel through an arc of 180 degrees into a chamber 41 formed in the element 3. In the unlocked position, the face of the latch 40 would be in a position to contact with the grooved face of the arm 30. Assuming that the spoke engaging arm 30 were in the dotted position shown in Figures 1 and 2 and it was desirable to prevent rotation of the steering wheel mounted on the steering column, the latch 40 would be placed out of engagement with the arm 30 permitting the said arm to be manually elevated and placed in contact with a spoke of the movable steering wheel, in which position the operator would rotate the latch of the cylinder to engage the same with the lowermost depression 36 in the arm member 30 thus locking the said arm in the elevated or operative position. With reference to the modifications illustrated in Figures 8 and 9, the arm would be raised and locked in the positions shown to prevent rotative movement of the steering wheel spokes. When the spoke engaging arm has been locked into engagement therewith, it is impossible to rotate the wheel or to steer the automotive vehicle successfully.

Having thus described this invention, what I claim and desire to secure by Letters Patent is:

1. A theft preventive such as described comprising a member adapted to partially surround the steering column of an automobile; a casing adapted to be locked into engagement therewith; an arm slidably retained in said casing and adapted to engage a steering wheel mounted on said column; a groove in said arm, a projection on said casing engaging said groove for limiting the sliding movement of said arm; and means for locking said arm in a plurality of positions relative to said wheel.

2. A theft preventive such as described, comprising a member adapted to partially surround the steering column of an automobile; a casing adapted to be locked into engagement therewith; a bushing adapted to be interposed between said member and casing; a bolt in said bushing adapted to fixedly engage the steering column and having the head thereof projecting away from said bushing; an arm slidably retained in said casing and adapted to have the end thereof engaging a steering wheel mounted on said column; a groove in said arm adapted to receive the projecting bolt head for limiting the sliding movement of said arm; and means for locking said arm in a plurality of positions relative to said wheel.

3. A theft preventive such as described comprising a member adapted to partially surround the steering column of an automobile; a casing adapted to be locked into engagement therewith; a bushing adapted to be interposed between said member and casing; an arm slidably retained in said casing and adapted to engage a steering wheel mounted on said column; a groove in said arm, a projection on said casing engaging said groove for limiting the sliding movement of said arm; and means for locking said arm in a plurality of positions relative to said wheel.

4. A theft preventive such as described comprising a member adapted to partially surround the steering column of an automobile; a casing adapted to be locked into engagement therewith; a bushing adapted to be interposed between said member and casing; an arm slidably retained in said casing and adapted to engage a steering wheel mounted on said column; means for locking said arm in a plurality of positions relative to said wheel and means on said bushing for limiting the vertical movement of said arm.

5. A theft preventive such as described comprising a member adapted to partially surround the steering column of an automobile; a casing adapted to be demountably connected therewith; a bushing adapted to be interposed between said member and casing; an arm slidably retained in said casing and adapted to engage a steering wheel mounted on said column; a locking bolt on said casing and means for rotating said bolt into engagement with said arm for locking said arm in a plurality of positions relative to said wheel.

In testimony whereof, I have hereunto set my hand at San Francisco, California, this 7th day of March 1921.

JOHN J. POTTINGER.

In presence of:—
LINCOLN V. JOHNSON.